Patented Dec. 6, 1932

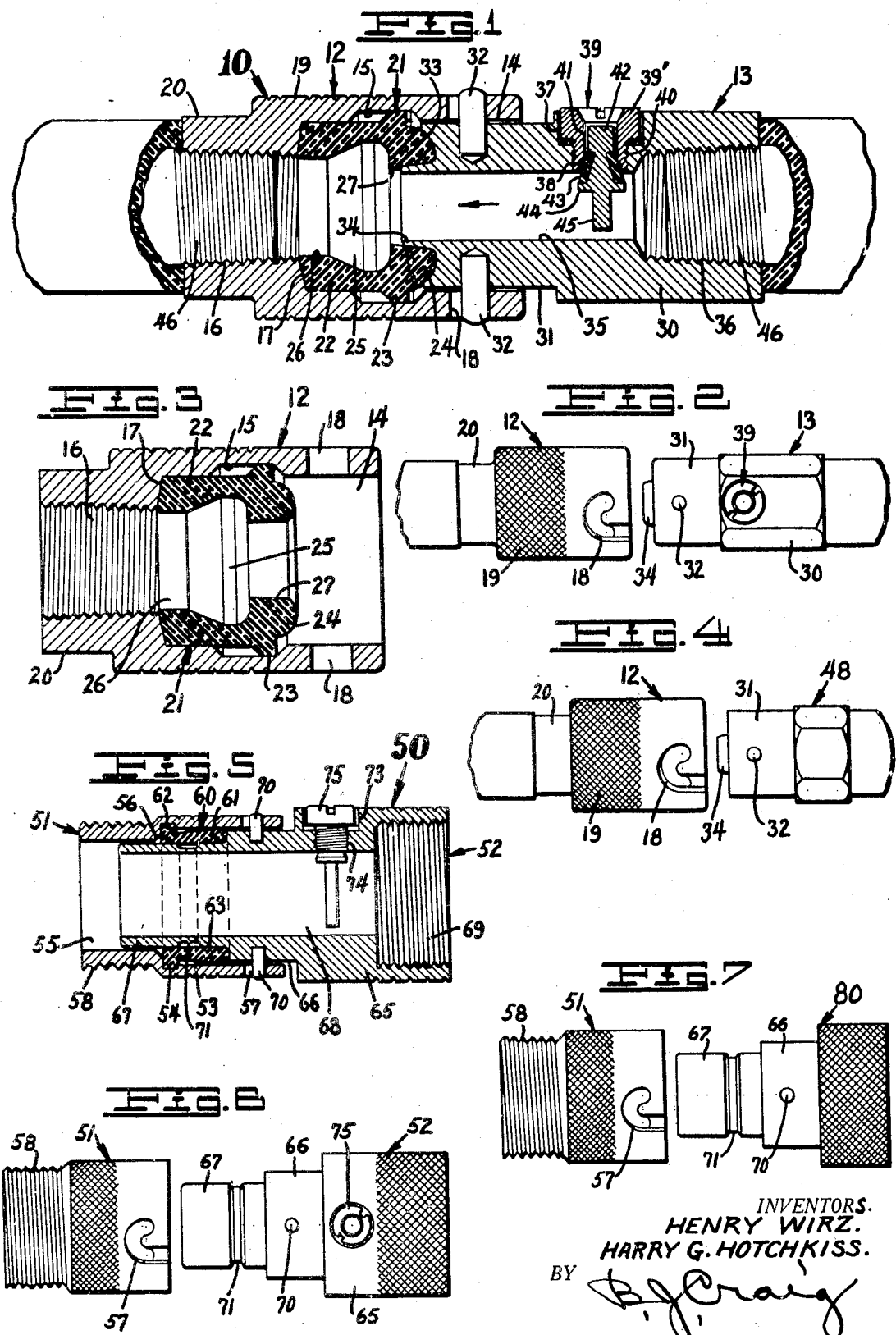

1,890,011

UNITED STATES PATENT OFFICE

HENRY WIRZ AND HARRY G. HOTCHKISS, OF LOS ANGELES, CALIFORNIA

COUPLING DEVICE

Application filed May 5, 1930. Serial No. 449,741.

This invention relates to improvements in coupling devices for connecting hollow conductors.

The general object of this invention is to provide a coupling device for connecting hollow conductors having novel means to prevent the leakage of fluid from the coupling device.

A further object of the invention is to provide a coupling device including a novel compressible packing.

A still further object of the invention is to provide a coupling device having built-in means to relieve the pressure in the conduit with which it is associated.

Other objects and advantages of this invention will be apparent from the following description taken in connection with the accompanying drawing wherein:

Fig. 1 is a central longitudinal section through one of our improved coupling devices showing it as operatively connecting two conduits.

Fig. 2 is a top plan view of the coupling device on a reduced scale showing the two members thereof separated.

Fig. 3 is a central longitudinal section through one member of the coupling.

Fig. 4 is a view similar to Fig. 2 showing a modified form of nipple.

Fig. 5 is a central longitudinal section through a modification of the coupling device.

Fig. 6 is a top plan view of the coupling device shown in Fig. 5 on a reduced scale, showing the two members thereof separated, and Fig. 7 is a similar view showing a modified form of nipple.

Referring to the drawing by reference characters we have indicated our improved coupling device generally at 10. As shown this coupling comprises a socket portion 12 and a nipple 13.

The socket 12 includes a recess 14 provided intermediate its length with a grooved portion 15 which communicates with a reduced threaded aperture 16 having a bevelled shoulder 17 at the juncture of the recess and the aperture.

In the wall of the socket adjacent the open end of the recess 14 we preferably provide two oppositely disposed bayonet slots 18 and the exterior of a portion of the socket is preferably knurled as indicated at 19 while a flattened wrench engaging portion 20 is preferably provided adjacent the threaded portion of the socket.

Positioned in the recess 14 we provide a packing member 21 which is preferably made of a good grade of rubber or other suitable resilient material. As shown this packing member comprises a body portion 22 provided with an enlarged flange 23 adjacent one end having a rounded annular boss 24 on the flanged end while the opposite end is bevelled to fit the tapered shoulder 17 of the socket.

Within the body 22 of the packing member there is provided a chamber 25 which at one end tapers down to a reduced aperture 26 and at the opposite end communicates with another reduced aperture 27, the side walls of which are slightly tapered. The external diameter of the body portion 22 is of approximately the same diameter as the socket recess 14 and the outside diameter of the flange 23 is of approximately the same diameter as the diameter of the grooved portion 15 of the socket. When the packing member is operatively positioned in the socket the flange 23 of the packing is positioned in the undercut portion 15 of the socket and the bevelled end of the packing abuts the bevelled shoulder 17 of the socket as clearly shown in Fig. 3.

The nipple 13 comprises a body portion 30 which is shown as polygonal, and a reduced portion 31 which is annular in cross section and is of a size to be inserted in the recess 14 of the socket. On the reduced portion 31 we provide opposed pins 32 which are adapted to fit the bayonet slots 18 of the socket. In the end of the reduced portion 31 we provide an annular recess 33 beyond which a reduced extension 36 projects. The recess 33 is shaped to conform to the shape of the annular boss 24 of the packing member and the extension 34 is adapted to be positioned in the aperture 27 of the packing member.

The nipple 13 is provided with a longitudinal aperture 35 which terminates in an enlarged threaded recess 36 adjacent the polygonal portion of the body. In the body portion 31 we may provide a recess 37 from which a threaded aperture 38 extends into the aperture 35.

Positioned in the recess 37 we show a relief valve 39 which comprises a plug 39' which includes a threaded portion 40 adapted to be positioned in the threaded aperture 38. The plug has a central aperture 41 which is countersunk at each end. Positioned in the aperture 41 we provide a stem 42 which includes a conical portion having a resilient member 43 thereon which rests on an enlarged flange 44 and is adapted to engage the sides of the lower countersunk portion of the aperture 41 to restrict passage through the aperture. Extending from the flange 44 we provide a reduced stem 45 which is adapted to limit the inward movement of the stem 42.

The device 10 may be used to connect various types of conduits. We have shown hose connections 46 as secured in the threaded portion 16 of the socket and in the threaded portion 36 of the nipple.

To secure two conduit members together with this device the reduced end 31 of the nipple 13 is inserted in the recess 14 of the socket 12, the pins 32 being positioned in the bayonet slots 18 and turned to lock the socket and nipple together. As the nipple moves into the socket the reduced end 34 of the nipple enters the aperture 27 of the packing member 21 and the annular boss 24 of the packing member is positioned in the annular groove 33 of the nipple. Upon further inward movement of the nipple the packing member 21 is compressed and when the socket and nipple are locked together as shown in Fig. 1 the packing member is compressed and tightly engages the bevelled shoulder 17 of the socket, the sides of the recess 14 and the grooved portion 15. The annular boss 24 of the packing member tightly engages the surface of the annular recess 33 while the walls of the aperture 27 tightly engage the outer surface of the reduced portion 34 of the nipple.

The fluid may be run through the device 10 in either direction but it is preferable to have it flow in the direction indicated by the arrow in Fig. 1. As the fluid flows through the device the pressure thereof in the chamber 25 of the packing member tends to expand the packing member thereby forcing the various points of contact into tighter engagement.

When the device is operatively interposed in a fluid conduit the pressure of the fluid retains the stem 42 in a raised position with the resilient member 43 in engagement with the underside of the plug 39, thereby preventing fluid from passing out through the aperture 41.

Frequently after the fluid supply is shut off the conduit still retains pressure so that it is difficult to uncouple the conduits. When this occurs the operator pushes the stem 42 inwardly whereupon the fluid in the conduit flows out through the aperture 41, thereby reducing the pressure in the conduit whereupon the device 10 may be readily disconnected.

In Fig. 4 we have shown a nipple 48 as adapted to be used in combination with the socket 12. This nipple 48 is similar in all respects to the nipple 13 except that it does not include the relief valve 39.

In Figs. 5 and 6 we have indicated generally at 50 a slightly modified form of our invention. As shown this modified coupling comprises a socket portion 51 and a nipple 52. The socket 51 includes a recess 53 which terminates in an undercut portion 54 and communicates with a reduced aperture 55. The shoulder at the juncture of the undercut portion and the reduced aperture is preferably partly bevelled as indicated at 56. In the wall of the socket adjacent the open end of the recess 53 we provide oppositely disposed bayonet slots 57 while adjacent the opposite end of the socket we preferably provide a reduced externally threaded portion 58.

Positioned in the recess 53 we provide a packing member 60 which is preferably made of a good grade of rubber or other suitable resilient material. As shown this packing member comprises a body portion 61 terminating in an enlarged flange 62 which is positioned in the undercut portion 54.

The packing member 60 is provided with an aperture 63 of approximately the same internal diameter as that of the reduced aperture 55 of the socket and the external surface of the body portion 61 is tapered inwardly towards the flange 62.

The nipple 52 comprises a body portion 65 and a reduced neck 66 which is of a size to be positioned in the recess 53 of the socket and a stem 67 which is of a size to be positioned in the reduced aperture 55 of the socket. Extending longitudinally through the nipple 50 we provide an aperture 68 which communicates with an enlarged threaded recess 69 adjacent the end of the body 52. On the reduced neck 66 we provide opposed pins 70 which are adapted to fit the bayonet slots 57 and intermediate the length of the reduced stem 67 on the exterior thereof we provide an annular groove 71. In the body portion 65 we provide a recess 73 from which a threaded aperture 74 extends into the aperture 68. Positioned in the recess 73 we provide a relief valve 75 which is similar in all respects to the relief valve 39 of the device 10 and is adapted for the same use as the relief valve 39.

To connect the socket 51 and the nipple 52 the stem 67 and neck 66 of the nipple are inserted into the socket, the pins 70 being positioned in the bayonet slots 57 and turned to lock the socket and the nipple together. As the nipple 52 moves into the socket 51 the stem 67 moves through the aperture 63 of the packing member 60 and into the aperture 55 of the socket until the shoulder at the juncture of the neck 66 and the stem 67 engages the end of the body 61 of the packing member, and upon further inward movement of the nipple the packing member is partly compressed thereby forming a tight connection between the socket 51 and the nipple 52.

When the device 50 is operatively installed in a conduit if the fluid passing therethrough has a pressure sufficient to back up around the stem 67 it will enter the groove 71 and tend to expand the packing member thereby forcing the packing member into tighter engagement with the socket and the shoulder at the juncture of the stem and neck of the nipple.

In Fig. 7 we have shown a nipple 80 as adapted to be used in combination with the socket 51. This nipple 80 is similar in all respects to the nipple 52 except that it does not include the relief valve 75.

From the foregoing description it will be apparent that we have provided a novel coupling device which is simple in construction and highly efficient in use.

What we claim is,

1. A packing member for use in a hose coupler, said packing member having a cylindrical external surface with an external flange at one end thereof connected to said cylindrical surface by a bevelled portion, said member having a chamber therein, said member having an internal flange at one end thereof, said flange having a rounded end portion and having a tapered aperture communicating at one end with said chamber, said member having a second aperture at the end opposite to said external flange and communicating with said chamber, the wall of said chamber being defined by a tapered portion, a cylindrical portion and a curved portion.

2. A packing member comprising a body portion having a chamber therein, one end of said body being bevelled, there being an aperture adjacent said bevelled end communicating with said chamber, an enlarged internal flange adjacent the opposite end of said body, a reduced annular boss on said flange, said flange having an aperture communicating with said chamber, an external flange on said body adjacent said boss, said external flange having a cylindrical outer surface, a plane surface and a bevelled surface, said chamber being defined by a cylindrical wall, a tapered wall and a curved wall.

3. A conduit coupler, said coupler comprising a socket portion and a nipple portion, means to secure said socket portion to a conduit and means to secure said nipple portion to a conduit, means to releasably secure said socket and said nipple together, said socket including a counterbore, a groove intermediate the length of said bore, a shoulder at the end of said counterbore, a resilient packing member positioned in said bore, said packing member comprising a body portion having a chamber therein, one end of said body being adapted to engage said shoulder of said counterbore, there being an aperture adjacent said shoulder engaging end and in communication with said chamber; an enlarged internal flange adjacent the opposite end of said body, a reduced annular boss on said flange, there being a tapered aperture in said body adjacent said boss and communicating with said chamber, an external flange on said body, said external flange being positioned in said groove, said nipple including a body portion and a reduced neck, a reduced tapered portion on the end of said neck, an annular recess in the shoulder at the juncture of said neck and said reduced portion, said tapered reduced portion being adapted to be positioned in said aperture of said packing member and said annular boss thereof being adapted to be positioned in said annular recess of said nipple.

4. In a hose coupling a socket having internal bores of two diameters with an internal recess in the larger of said bores, a gasket having an internal bore coaxial with the smaller of said two bores, said gasket being rounded at one end, a nipple, said nipple having two portions of different diameters to fit said two bores, there being a shoulder on the nipple, said shoulder being rounded and being adapted to engage the rounded portion of said gasket.

5. For use in a hose coupling a gasket having a cylindrical inner wall, said gasket having an external flange at one end thereof, said flange having an external cylindrical wall, said gasket being rounded at the end opposite to said flange, the outer wall of said gasket being tapered from the rounded end toward said flange.

6. In a hose coupling a socket having internal bores of two diameters with an internal recess in the larger of said bores, a gasket having a flange fitting said recess and having an internal bore coaxial with the smaller of said two bores, the outer wall of said gasket being tapered, said gasket being rounded at the end opposite to said flange, a nipple, said nipple having two portions of different diameters to fit said two bores, one portion of said nipple having an external groove intermediate the length thereof, there being a shoulder at the juncture of said portions of the nipple, said shoulder being rounded and being adapted to engage the rounded portion of said gasket.

7. A hose coupling comprising a socket member having a central counterbore and an internal groove in said counterbore, a gasket having a wall fitting said counterbore and having a flange in said groove, said flange having a width less than that of said groove whereby the flange may move axially in said socket member, said gasket having an internal chamber with apertures leading thereto from each end, a nipple having a neck fitting said counterbore and having a reduced portion thereon, said reduced portion fitting one of said gasket apertures.

8. In a coupling device, a socket, said socket having a counterbore, there being a groove in said counterbore and a shoulder, a gasket having a body fitting said counterbore, said gasket having a peripheral flange in said groove and an end engaging said shoulder, said flange being of less length than said groove, whereby the flange can move in the groove, and a nipple engaging the end of said gasket.

In testimony whereof, we hereunto affix our signatures.

HENRY WIRZ.
HARRY G. HOTCHKISS.